United States Patent [19]

Blanchart et al.

[11] 4,362,790
[45] Dec. 7, 1982

[54] POROUS ELECTRODE

[75] Inventors: Alain P. O. Blanchart, Balen; Gilbert J. L. Van Bogaert, Mol; Constantine W. M. V. A. De Brandt, Itterbeek; Gustaaf J. F. Spaepen, Dessel, all of Belgium

[73] Assignee: Electrochemische Energieconversie, N.V., Geleen, Netherlands

[21] Appl. No.: 235,157

[22] Filed: Feb. 12, 1981

Related U.S. Application Data

[63] Continuation of Ser. No. 113,029, Jan. 15, 1980, abandoned, which is a continuation-in-part of Ser. No. 968,812, Dec. 12, 1978, abandoned.

[30] Foreign Application Priority Data

Dec. 28, 1977 [NL] Netherlands ..................... 7714464

[51] Int. Cl.$^3$ .......................................... H01M 4/92
[52] U.S. Cl. .................................................... 429/42
[58] Field of Search ......................................... 429/42

[56] References Cited

U.S. PATENT DOCUMENTS

| | | | |
|---|---|---|---|
| 3,306,779 | 2/1967 | Flannery | 429/42 |
| 3,704,171 | 11/1972 | Landi | 429/42 |
| 4,091,176 | 5/1978 | Alfenaar | 429/42 |

Primary Examiner—Donald L. Walton

[57] ABSTRACT

The invention relates to a porous electrode comprising at least a porous catalytic layer containing a catalytically active noble-metal, carbon and a polymeric binder and a porous metallic collector is situated on the electrolyte-side of this layer.

According to the invention the catalytic layer has a thickness of less than 80 μm and are the noble-metal particles in the layer situated on the surface and/or in the pores of part of the carbon particles, while the rest of the carbon particles contains no noble-metal particles.

The invention meets the need of an electrode of the type described with a much lower noble-metal content, while the excellent characteristics as regards efficiency, power density and simplicity of manufacture are retained.

12 Claims, 3 Drawing Figures

POROUS ELECTRODE

This is a continuation of application Ser. No. 113,029 filed Jan. 15, 1980, now abandoned, which in turn is a continuation-in-part of application Ser. No. 968,812 filed Dec. 12, 1978, now abandoned.

BACKGROUND OF THE INVENTION

The invention relates to a porous electrode comprising at least a porous catalytic layer containing a catalytically active noble-metal of the type described below, carbon and a polymeric binder and a porous metallic collector is situated on the electrolyte-side of this layer. An electrode of this kind is known from the Netherlands patent application No. 7214900 laid open for public inspection.

Electrodes of this kind are particularly suitable in fuel cells. During operations the fuel used penetrates into the pores of the catalytic layer, where it is burnt galvanically. The generation of electric current takes place throughout the catalytic layer and the current generated is collected by a collector system and transmitted. The electrode is in contact with a suitable electrolyte which closes the circuit within the fuel cell and by which the products of reactions occurring at the cathode and anode can also be discharged.

A drawback of the known electrode is the comparatively large amount of noble-metal that is required for its manufacture. For instance, the known electrode contains 0.4 mg/cm$^2$ of platinum and palladium, which excludes large-scale application of the electrode in view of the present short supply of noble-metals. The problems about the fuel cell containing noble-metals have been discussed, e.g., in the Report "Elektrochamische Aspekten van de Energievoorziening" by the Stichting Nederlands Instituut voor Elektrowarmte en Elektrochemie NIVEE, 1975, pp. 62 and 63. According to this article reduction of the amount of noble-metal in the electrode might be considered, but this will lead to a lower efficiency and a lower power density, while also the rise in production cost is considered to be a problem.

The invention meets the need of such an electrode with a much lower noble-metal content, while the excellent characteristics as regards efficiency, power density and simplicity of manufacture are retained.

DESCRIPTION OF THE INVENTION

According to the invention the porous electrode comprises at least a porous catalytic layer containing a catalytically active noble metal, carbon and a polymeric binder and a porous metallic collector, which is situated on the electrolyte-side of the porous catalytic layer, it being characterized in that the catalytic layer has a thickness of less than 80 $\mu$m and in that the noble-metal particles in the layer are situated on the surface and/or in the pores of part of the carbon particles, while the rest of the carbon particles contain no noble-metal particles. More particularly, the invention involves such a porous electrode having a catalytically active noble-metal content of at most about 250 $\mu$g/cm$^2$.

The invention is based on the discovery that, in electrodes of this type, very thin catalytic layers of 40 $\mu$m or even of 30 $\mu$m and less, which moreover contain considerably lower concentrations of noble-metals, can give as high or even improved efficiencies and power densities as the more highly concentrated and thicker layers of 80 $\mu$m or more used in the known electrodes, provided the noble-metal particles are distributed over the carbon particles in a specific way. This specific distribution is achieved by a thorough mixing of catalyst supporting carbon particles and catalyst free carbon particles. The required amount of noble-metal can thus be reduced by a factor 10 or more, at the same performance of the electrode. The usual problem of the occurence of hot spots in an electrode containing a very low concentration of catalyst is solved by the specific way of distributing the noble-metal particles over the carbon particles according to the present invention. An additional advantage of the electrode according to the invention is the considerably improved conduction of ions during operation.

It is pointed out that electrodes in which part of the carbon particles present contain noble-metal particles and the rest of the carbon particles do not are known. Carbon particles other than the noble-metal-on-carbon particles used as a catalyst are then applied as a means of improving the electron-conductivity (see the U.S. Pat. No. 3,306,779 and French Pat. No. 2,344,969). However, it has never been discovered that by applying this measure in electrodes as described at the top of this specification much thinner catalytic layers may be used, with retention of performance, and, in addition, an even smaller noble-metal concentration, and substantially improved ionconductivity during operation. Until now it also has never been disclosed how to solve the "hot spot" problem usually occuring in electrodes containing a concentration of catalyst which is as low as the concentrations used according to the present invention, and which is much lower than applied before according to the state of the art. This problem is now solved by the present invention.

The term "noble-metal" is taken in its wider sense and comprises such elements as platinum, palladium, iridium, rhodium, silver, and gold and mixtures of two or more of such elements. Noble metals to be used in particular in the porous electrode according to the invention are platinum and palladium or a mixture thereof.

The catalytically active layer in the electrode according to the invention may be made particularly thin in an anode, in particular in a hydrogen electrode for a fuel cell burning hydrogen. By preference, the catalytically active layer then has a thickness of at most 60 $\mu$m.

The catalytically active metal is present as particles on and/or in a part of the carbon particles. It is essential to the invention that not all carbon particles contain metal particles. By preference, 10–90% by weight of the carbon particles contain catalytically active metal. It is quite possible, though, for the metal particles to be distributed unevenly over the metal-containing carbon particles. For instance, part of the carbon particles may contain a relatively high concentration of catalytically active metal and another part a lower concentration. The carbon type in the carbon particles with catalytically active metal may differ from the carbon type in the other carbon particles.

The polymeric binder may be any suitable resin, particularly an apolar synthetic resin. Various resins for this purpose are well-known, e.g. polyethylene, polypropylene, polyvinylchloride, and, particularly, polytetrafluoroethylene. The last one is to be preferred.

The porosity of the catalytic layer may be the same over the entire thickness of the porous layer, but it may also increase or decrease, either gradually or stepwise, over the thickness.

The electrode comprises a porous metallic collector which, in practice, consists of, e.g., a metal gauze with a wire thickness of about 150 μm and a mesh width of approximately 700 μm or a corresponding perforated metal plate. Expanded metal may also be used. The metal gauze of the collector may be made of any suitable material, e.g. nickel or steel. The collector material may be surrounded by a contiguous collector coat of an electrically conducting resin or a mixture of resin and a conducting material, e.g., carbon, in order to oppose corrosion of the collector.

For the correct operation of the electrode it is important that the collector be situated on the electrolyte-side of the catalytic layer. This has advantages also in the construction of the electrode.

The electrodes according to the invention may be made in any suitable way. For instance, powdered carbon is mixed with a powder of a catalytically active metal on carbon and powdered polytetrafluoroethylene and, if so desired, a pore former, and then the aggregate is pressed into an electrode at elevated temperature, e.g. in a suitable mould, after which the pore former can be lixiviated, e.g. with hot water. Suitable pore formers are soluble salts, such as sodium sulphate, sodium carbonate, ammonium carbonate, and the like.

It is advantageous first to make the catalytic layer and the collector separately and then to press the collector on the electrolyte side at least partly into the layer composition obtained. A very firm electrode with good porosity properties is thus obtained. The catalytic layer may also be formed in situ by deposition onto the collector.

In the electrodes according to the invention the layer that contains the catalyst and which is sufficiently porous to allow gas and liquid to pass preferably adjoins a layer that is impervious to liquid, but pervious to gas. During operation the layer that is pervious to gas and liquid is then in contact with the electrolyte, e.g. a sodium-hydroxide or potassium-hydroxide solution or a phosphoric-acid solution, and the layer that is pervious to gas only is in contact with the gas. At the anode the gas consists in the gaseous fuel, e.g. hydrogen. At the cathode the gas consist in oxygen or a gas containing molecular oxygen, e.g. air.

Figure 1:
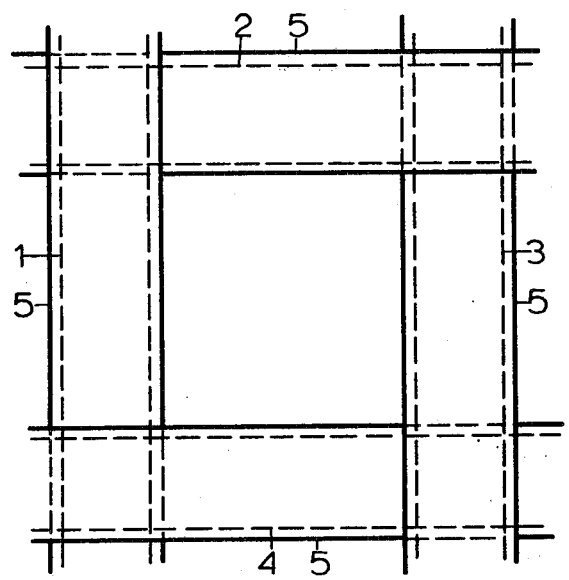
FIG. 1 is a top view of part of the electrode.

The nickel or steel wires 1, 2, 3 and 4 form part of the collector gauze. Instead of wire gauze, a perforated nickel or steel plate, so-called expanded metal, may be used. The thickness of the wires is about 150 μm, the porosity of the collector gauze about 50%.

The term porosity as used here and hereinafter denotes the ratio between the volume taken up by the pores, or the volume not taken up by the particular material, and the volume of the layer concerned.

The collector wires are surrounded by a collector protection coat 5, which consists of core varnish Elastolux blank V2037 of the firm of Tollens (an epoxy resin), containing 50% by weight (of the resin + graphite) of graphite particles. The thickness of the layer amounts to 15 μm.

The coated collector wires are embedded in a porous layer made up of constituent layers 6, 7 and 8. When the electrode is in operation, the electrolyte phase is at 9. Of course, some electrolyte has then penetrated into the pores of the electrode. Furthermore, when the electrode is in operation, the gaseous phase is at 10. In this example use is made of a gas mixture containing molecular oxygen, namely air. Layer 6 consists of a mixture of 90% by weight of carbon and 10% by weight of polytetrafluoroethylene. The polytetrafluoroethylene content may, however, vary, but it should preferably be between 8 and 15% by weight. Layer 6 is approximately 40 μm thick, but less, of course, in the vicinity of collector wires 1 and 3. The porosity of layer 6 is 30%, apart from the micropores that are present in the carbon particles and which are not important to the working of the electrode. By preference, it will always be between 25 and 35%. The pore width is 1 to 10 μm. This porosity depends on the particle size of the carbon powder and the polytetrafluoroethylene powder used to make the layer and on the pressure used in making the electrode. The same applies to the porosities on the layers 7 and 8 still to be discussed.

Layer 7 is the catalytic layer and has a thickness of 40 μm. It consists of a mixture of carbon particles without platinum, carbon particles containing 5% by weight of platinum, and polytetrafluoroethylene. The polytetrafluoroethylene content preferably ranges between 15 and 30% by weight and is 21% by weight in this example. The porosity is 20% and preferably always ranges between 20 and 25%. The carbon particles without platinum make up 7 to 75% by weight of layer 7, in this example 63% by weight. The platinum content amounts to 27 $\mu g/cm^2$.

Layer 8 is 180 μm thick on an average and consists entirely of polytetrafluoroethylene. The average porosity is 50% and the pore width is between 1 and 10 μm, just as in layers 6 and 7.

EXAMPLE AND COMPARATIVE EXPERIMENTS

Figure 2:
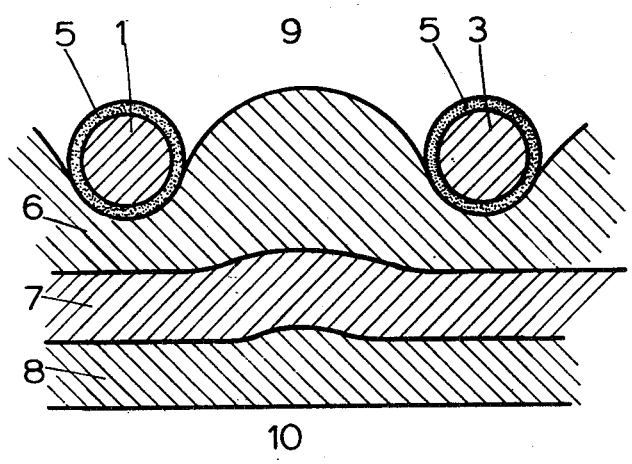
FIG. 2 shows a section normal to the electrode surface.

This example illustrates the use of the invention in a gas-diffusion electrode. Reference is made to the diagrammatic FIGS. 1 and 2 annexed.

Figure 3:
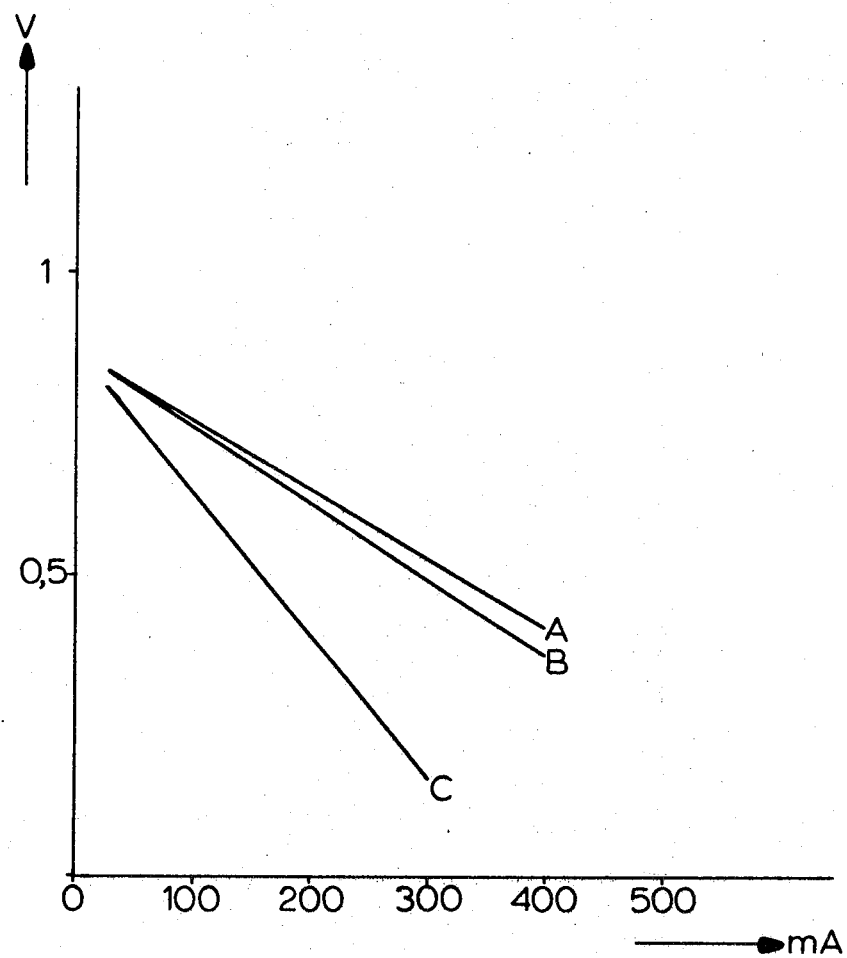
FIG. 3 is a graph of the fuel cell's current voltage, efficiency and power density. The same numbers refer to the same parts.

Two electrodes of the type described above were used as hydrogen electrode and as air electrode, respectively, in a hydrogen-air fuel cell. The electrolyte used was a 6.6 N aqueous potassium-hydroxide solution. The fuel cell operated at a pressure of 1 atm. and at 65° C. The current voltage curve is shown by FIG. 3, graph A. As likewise shown by FIG. 3, efficiency and power density were even better than those of a fuel cell with otherwise similar electrodes with a thickness of layer 7 of 120 μm with evenly distributed platinum metal in an amount of 400 $\mu g/cm^2$ (graph B). A fuel cell with otherwise similar electrodes with a thickness of layer 7 of 40 μm with evenly distributed platinum metal in an amount of 27 $\mu g/cm^2$ gave the current voltage curve shown in FIG. 3 as graph C. This curve implies a considerably poorer behaviour of the fuel cell.

What is claimed is:

1. A porous electrode comprising at least a porous catalytic layer containing a catalytically active noble-metal, carbon and a polymeric binder and a porous metallic collector, which is situated on the electrode-side of the porous catalytic layer, wherein the catalytic layer has a thickness of less than 80 μm and a catalytically active noble-metal content of at most about 250

$\mu g/cm^2$, and wherein the noble-metal particles in the layer are situated on the surface and/or in the pores of part of the carbon particles, while the rest of the carbon particles contain no noble-metal particles.

2. The electrode according to claim 1, wherein the catalytically active metal is platinum, palladium, or a mixture thereof.

3. The electrode according to claim 1 or 2, wherein 10-90% by weight of the carbon particles contain catalytically active metal.

4. The electrode according to claims 1 or 2, wherein the electrode is an anode.

5. The electrode according to claims 1 or 2, wherein the electrode is a hydrogen electrode anode for a fuel cell burning hydrogen.

6. The electrode according to claims 1 or 2, wherein the catalytic layer has a thickness of at most 40 $\mu m$.

7. The electrode according to claims 1 or 2, wherein the polymeric binder is an apolar synthetic resin.

8. The electrode according to claim 1, wherein the polymeric binder is an apolar synthetic resin and said polymeric, binder is polytetrafluorethylene.

9. An electrochemical cell employing at least one electrode comprised of a porous catalytic layer containing a catalytically active noble-metal, carbon and a polymeric binder and a porous metallic collector, which is situated on the electrolyte-side of the porous catalytic layer wherein, the catalytic layer has a thickness of less than 80 $\mu m$ and a catalytically active noble-metal content of at most about 250 $\mu g/cm^2$, and wherein the noble-metal particles in the layer are situated on the surface and/or in the pores of part of the carbon particles, while the rest of the carbon particles contain no noble-metal particles.

10. The electrode according to claims 1 or 2, wherein 10-90% by weight of the carbon particles contain a catalytically active metal and wherein said electrode is an anode.

11. The electrode according to claims 1 or 2, wherein the electrode is a hydrogen electrode anode for a fuel cell burning hydrogen and wherein the catalytic layer has a thickness of at most 40 $\mu m$.

12. The electrode according to claims 1 or 2, wherein 10-90% by weight of the carbon particles contain catalytically active metal and said catalytic layer has a thickness of at most 40 $\mu m$ and said polymeric binder is polytetrafluoroethylene.

* * * * *